March 11, 1969   V. M. SOLIPASSO   3,432,182
COASTING VEHICLE
Filed Feb. 6, 1967

VICTOR M. SOLIPASSO
INVENTOR

Huebner & Worrel
ATTORNEYS

United States Patent Office 3,432,182
Patented Mar. 11, 1969

3,432,182
COASTING VEHICLE
Victor M. Solipasso, Sanger, Calif., assignor of one-fifth each to Harvey A. Jacobsen, Fresno, and Ronald H. Metzler, Del Rey, Calif.
Filed Feb. 6, 1967, Ser. No. 614,254
U.S. Cl. 280—18
Int. Cl. B62b 13/16, 13/12
4 Claims

ABSTRACT OF THE DISCLOSURE

A coasting vehicle having an elongated hollow body of flexible material which is collapsible to substantially unrestrained shape and which is selectively expandable to a predetermined resiliently yielding form by the introduction of a flowable fluid into the body so that in such expanded condition the body includes a continuous arcuately upwardly bent forward end and a fluid chamber longitudinally coextensive with the body and the return-bent end so that such fluid is flowably interchangeable within the chamber resistively to accommodate indentations in the body incident to encountering irregularities in the terrain over which the vehicle passes. In its preferred embodiment, the invention takes the form of a pneumatically inflated toboggan.

BACKGROUND OF THE INVENTION

Conventional toboggans are usually constructed of wood or other substantially rigid material and provide an elongated substantially flat load supporting portion and an arcuately upwardly return-bent end. Such toboggans are of unitary construction and cannot be conveniently transported to coasting areas or conveniently stored. Because of their cumbersome size, the conventional toboggans are usually carried on the roofs of automobiles during transport to the coating areas which create hazardous control problems for the operators of the automobiles and a danger to others on the highways when the toboggans become inadvertently separated from their respective carriers. Furthermore, the number of toboggans which can be transported by a single automobile is limited. Consequently, after reaching the coasting area, such limited number of toboggans must be shared by all members of the particular group of users. The conventional wooden toboggans are also uncomfortable because of their unyielding construction which cannot conform to irregularities in the terrain traversed. Furthermore, such rigid construction readily transmits any shock forces imposed against the toboggan directly to the passengers. If the toboggan strikes an immovable object such as a tree or the like, the toboggan may break apart with the resulting splintered portions producing an even greater hazard to the passengers. Such toboggans are difficult accurately to control and are only steerable by the most experienced persons.

Therefore, it is an object of the present invention to provide an improved coasting vehicle which is relatively safe and comfortable during use.

Another object is to provide such an improved coasting vehicle which is more easily controlled by less experienced riders than that required by conventional coasting vehicles.

Another object is to provide an improved coasting vehicle which is effective to cushion and isolate the passengers from shock forces imposed against the vehicle.

Another object is to provide an improved coasting vehicle having a resiliently flexible body which substantially conforms to elevations and depressions in the terrain traversed.

Another object is to provide an improved coasting vehicle which is readily collapsible to a relatively compact size for convenient transport and storage in a minimum of space.

Another object is to provide an improved coasting vehicle which is readily expandable to a predetermined form for immediate use.

Another object is to provide an improved coasting vehicle which may be easily and economically manufactured in a variety of sizes.

Other objects and advantages of the present invention will subsequently become more clearly apparent upon reference to the following description and accompanying drawing.

DESCRIPTION OF THE PREFERRED EMBODIMENT

Figure 1:
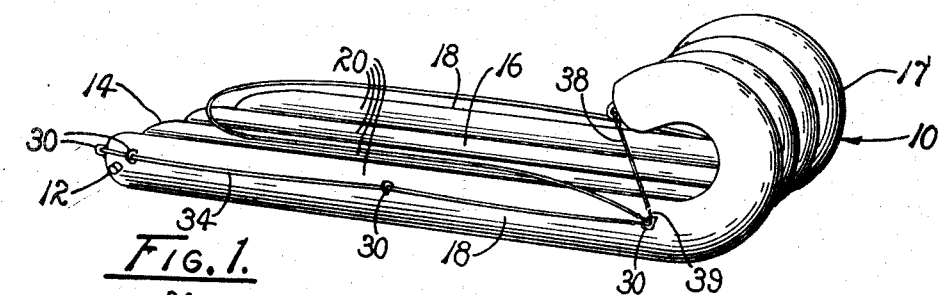
FIG. 1 is a perspective view of a coasting vehicle embodying the principles of the present invention.
Figure 2:
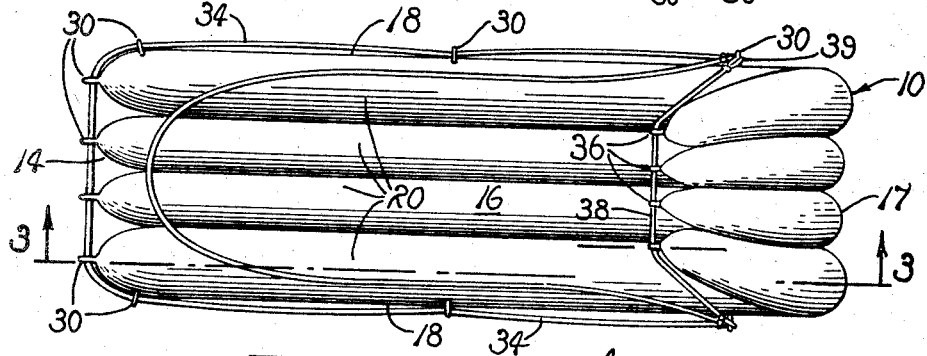
FIG. 2 is a top plan view of the coasting vehicle of the present invention.
Figure 3:
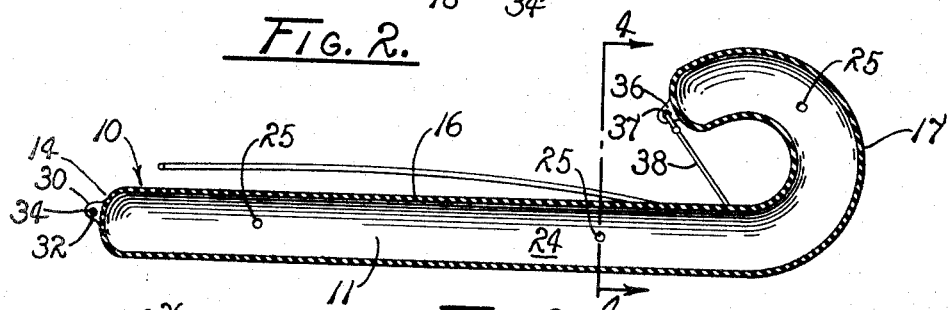
FIG. 3 is a central longitudinal cross section through the coasting vehicle, taken on line 2—2 of FIG. 1.

Referring more particularly to the drawing, a coasting vehicle embodying the principles of the present invention provides an elongated hollow body 10 of resiliently flexible material such as rubber, plastic or the like. The body is constructed in envelope form having a chamber 11 to receive a suitable flowable fluid such as compressed air, water, or the like, for inflation or expansion of the body to the form shown in the drawing. Prior to inflation, it is readily apparent that the body is of a substantially unrestrained shape and can be compactly folded for storage or transport in a minimum of space. An inflation tube 12 is extended from the body in communication with the chamber 11 for admitting the flowable fluid and is provided with suitable valve closure means, not shown, to prevent the escape of such fluid from the body.

As best shown in FIG. 1, when the coasting vehicle is inflated or expanded in operating condition, the body 10 provides a predetermined rearward end 14 from which is forwardly extended an elongated substantially rectangular load support or seat 16. The body has an arcuately upwardly return-bent forward end 17 which is continuous with the seat. The body further includes oppositely spaced substantially parallel sides extended between the forward and rearward ends.

Figure 4:
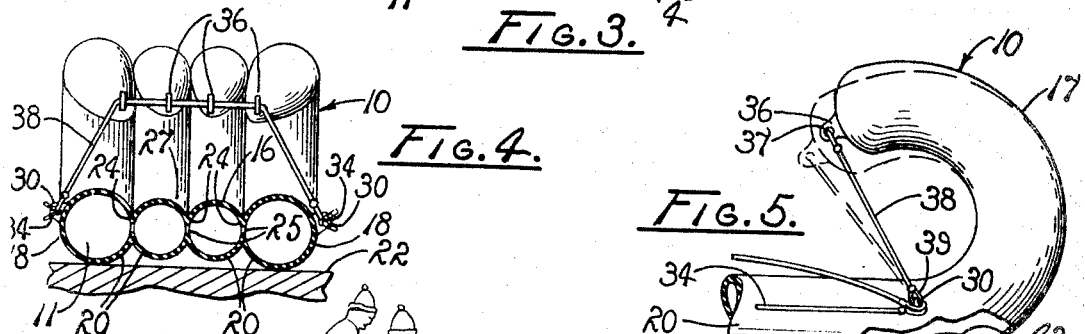
FIG. 4 is a transverse vertical section through the coasting vehicle, taken generally along the line 4—4 of FIG. 3.

The body 10 is formed by a plurality of elongated integral tubular members 20 which are extended in side-by-side relation longitudinally of the body. As best shown in FIG. 4, the tubular members at the opposite sides 18 of the body are preferably of a somewhat larger diameter than the intermediate tubular members so that the lower peripheries of the intermediate tubular members are disposed in elevated position above a support surface 22. When the seat 16 is in an unloaded or relatively lightly loaded condition, the lower peripheries of the outer tubular members serve as runners for the body so as to have less frictional drag and resistance to movement. When fully loaded, the outer tubular members contribute a controlling or directing expedient facilitating keel-like travel and improved guidance.

The tubular members 20 include common wall portions 24 therebetween which have a plurality of ports 25 therethrough for controlled interchange of fluid between the individual tubular members. The upper peripheries of the intermediate tubular members are spaced somewhat below the plane of the upper peripheries of the outer tubular members to define an elongated central depression or pocket 27 in the seat 16 so that passengers and other loads placed upon the body tend to be cradled and more securely held on the seat during movement of the vehicle. A plurality of integral tabs 30 are extended from the tubular members at the rearward end 14 of the body and in spaced relation along the outer peripheries of the outer tubular members. Each of the tabs has an opening 32 through which is extended a hand-gripping line or rope 34. The ends of the tubular members at the forward end 17 of the body provide similar tabs 36 having holes 37 through which is extended an elongated tension line 38 having opposite ends 39 fastened to the forwardmost tabs 30 at the sides of the body. Accordingly, the degree of curvature of the forward end can be readily adjusted and maintained with the tension line also being effective to preclude straightening of the body during operation.

OPERATION

The operation of the described embodiment of the subject invention is believed to be clearly apparent and is briefly summarized at this point. Prior to use, the coating vehicle is storable in a substantially flat folded or helically rolled condition to substantially less than its normal operating size. The coasting vehicle may be conveniently transported in such compact condition until reaching a coasting area.

Figure 5:
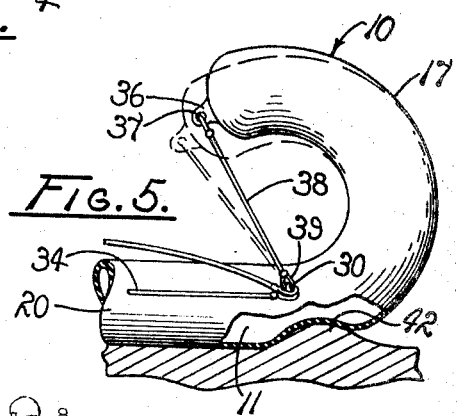
FIG. 5 is a somewhat enlarged fragmentary side elevation and partial section of the forward end of the coasting vehicle displaced from its normal dashed line position to a flexed full line position incident to passage of the vehicle over a protuberance in the terrain traversed thereby.

For use, the body is unfolded and inflated to its expanded operating position by introduction of compressed air or the like into the chamber 11. This may be conveniently accomplished by the use of readily available portable bottles of compressed air, carbon dioxide cartridges, hand pumps or by mouth, if necessary. After inflation to the form shown in the drawing, it is readily apparent that the body 10 is capable of supporting substantial loads on the seat 16 which loading is evenly distributed along the body by virtue of the connecting ports 25 in the common walls 24 of the tubular members 20. It is apparent that the ports provide some restriction to the flow of fluid between the tubular members so that the loaded portions of the body initially have a greater resistance to yielding under the load until the fluid equalizes within the body. The body is also resiliently yieldable to obstructions such as that indicated at 42 in FIG. 5 in the support surface 22. As shown, when the body encounters such an obstruction, the wall portion of the tubular member is flexed inwardly in further compressing relation to the fluid within the chamber 11 and is permitted to flow longitudinally of the member, thus providing additional support for the load upon the seat 16. Also during such traversation of the obstruction 42, the arcuate forward end 17 of the body 10 is permitted to flex from its normal dashed line position to its full line position providing a surplus of material to accommodate such inward flexing of the wall of the tubular member 20. As the body passes over the obstruction, the obstruction advances rearwardly along the entire length of the body to have a somewhat rippling effect on the material of the body and to cause a continuous interchange of fluid ahead and behind of the advancing inwardly flexed portion of the tubular member in continuous supporting relation to the seat.

Accordingly, it is readily apparent that such obstructions can be easily accommodated with substantially no excessive elevational or transverse tipping of the seat and with the fluid in the chamber 11 substantially isolating the passengers from any adverse effect of the obstruction during the described passage of the body thereover.

Figure 6:
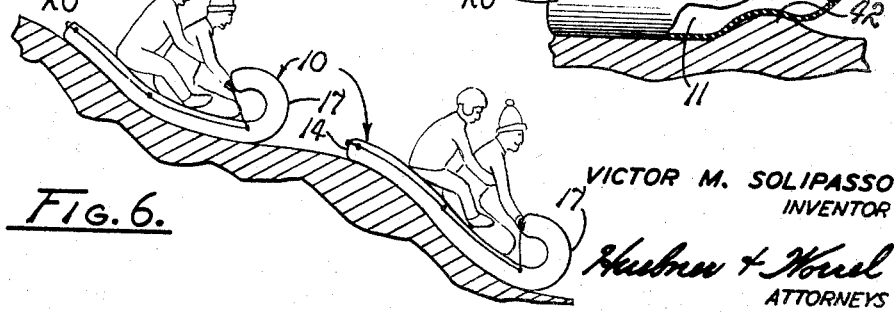
FIG. 6 is a somewhat reduced side elevation showing the coasting vehicle in progressive operating positions in substantial conforming relation to elevations and depressions in the terrain traversed.

Furthermore, and as shown in FIG. 6, the body 10 of the vehicle is capable of precisely conforming to elevations and depressions in the terrain traversed thereby. As before, the weight of the passengers is effectively supported during these and any conditions of travel. If the body should become temporarily air-borne, it is evident that the shock of impact upon return to the vehicle is effectively cushioned and absorbed by the fluid within the chamber 11 substantially to preclude any appreciable transmission of such shock forces to the passengers. This also enhances the passengers' chances of remaining on the seat no matter how severe such irregularities in the terrain become. Inasmuch as the body is in substantially complete engagement with the support surface, depending upon the amount of loading, the vehicle may be more precisely controlled by shifting the weight of the passengers in the usual manner.

It is readily apparent that the structure of the present invention provides an improved coasting vehicle having a body of resiliently flexible material which is storable and transportable in a compactly folded condition and which is conveniently expandable to a resiliently yieldable form for immediate use. The coasting vehicle of the present invention is more easily controlled by inexperienced persons, provides a more comfortable ride than conventional coasting vehicles and is safely adaptable for substantially universal use by persons of all ages.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A toboggan comprising an elongated hollow body of flexible material which is collapsible to substantially unrestrained shape and pneumatically inflatable to predetermined resiliently yielding form having predetermined forward and rearward ends and providing an elongated substantially rectangular straight load supporting seat portion extended from said rearward end and an arcuately upwardly return-bent portion at said forward end continuous with said seat portion, said body providing a pneumatic chamber longitudinally coextensive with said seat and return-bent portion, and a plurality of integral tubular members extended in side-by-side relation longitudinally of the body including oppositely spaced outer tubular members of a predetermined diameter and intermediate tubular members of a somewhat smaller diameter to define an upwardly disposed load receiving pocket coextensively with said seat portion of the body interposed the outer tubular members and said outer tubular members providing depending runners for the toboggan.

2. The toboggan of claim 1 including tension means releasably connected between said return-bent portion and said seat portion at the forward end of the body for adjusting the curvature of said return-bent portion.

3. The toboggan of claim 1 in which said tubular members include forwardly disposed rearwardly facing ends, a plurality of spaced tabs individually extended from said ends of the tubular members and providing aligned holes therethrough, and a tension line extended through said holes in the tabs having opposite ends individually releasably fastened to said outer tubular members forwardly adjacent to said seat portion of the body to adjust and to maintain the curvature of said forward end of the body and to preclude straightening of the body during use.

4. A toboggan comprising an elongated hollow body of flexible material which is collapsible to substantially unrestrained shape and pneumatically inflatable to predetermined resiliently yielding form having predetermined forward and rearward ends and providing an elongated substantially rectangular straight load supporting seat portion extended from said rearward end and an arcuately upwardly return-bent portion at said forward end continuous with said seat portion, said body providing a pneumatic chamber longitudinally coextensive with said seat and return-bent portion, a plurality of integral tubular members extended in side-by-side relation longitudinally of the body including oppositely spaced outer tubular members of a predetermined diameter and intermediate tubular members of a somewhat smaller diameter to define an upwardly disposed load receiving pocket coextensively with said seat portion of the body interposed the outer tubular members and said outer tubular members providing depending runners for the toboggan, and a plurality of common wall portions between adjacent tubular members having a plurality of ports therethrough for controlled interchange of air between the individual tubular members so that the portions of the body which are subjected to a load have a greater resistance to yielding until the air is equalized within the body.

References Cited

UNITED STATES PATENTS

| | | | |
|---|---|---|---|
| 1,891,491 | 12/1932 | Anderson | 9—2.1 |
| 2,816,299 | 12/1957 | Holladay | 9—11 |
| 3,140,878 | 7/1964 | Davis | 280—18 |
| 3,319,972 | 5/1967 | Gallaher | 280—18 |

LEO FRIAGLIA, *Primary Examiner.*

JOEL E. SIEGEL, *Assistant Examiner.*

U.S. Cl. X.R.

9—11.1